United States Patent [19]
Motsenbocker et al.

[11] Patent Number: 6,073,569
[45] Date of Patent: Jun. 13, 2000

[54] ADVANTAGEOUS USE OF BATTERY MASS IN ELECTRIC WATERCRAFT

[75] Inventors: Marvin A. Motsenbocker; Kayo Motsenbocker, both of Fredericksburg, Va.

[73] Assignee: Murata Electric Boatworks LLC, Fredericksburg, Va.

[21] Appl. No.: 09/252,038

[22] Filed: Feb. 18, 1999

Related U.S. Application Data

[60] Provisional application No. 60/076,002, Feb. 26, 1998.

[51] Int. Cl.⁷ .................................................. B63B 1/00
[52] U.S. Cl. ................. 114/61.1; 114/61.12; 114/61.13; 114/121; 440/6
[58] Field of Search .............................. 114/61.1, 61.12, 114/61.13, 61.14, 61.2, 61.26, 121; 440/3, 4, 6, 8

[56] References Cited

U.S. PATENT DOCUMENTS

| | | | |
|---|---|---|---|
| 1,759,644 | 5/1930 | Reed-Hill | 114/61.12 |
| 3,830,178 | 8/1974 | Lang . | |
| 3,897,744 | 8/1975 | Lang . | |
| 4,174,671 | 11/1979 | Seidl . | |
| 4,730,571 | 3/1988 | Hedlund et al. | 440/6 |
| 4,763,596 | 8/1988 | Yoshida . | |
| 4,811,682 | 3/1989 | Hwang et al. | 440/6 |
| 4,915,047 | 4/1990 | Lord et al. | 114/39.1 |
| 4,944,238 | 7/1990 | Lang . | |
| 5,178,085 | 1/1993 | Hsu . | |
| 5,540,169 | 7/1996 | Davis et al. . | |
| 5,694,878 | 12/1997 | Masuyama . | |

FOREIGN PATENT DOCUMENTS

| | | | |
|---|---|---|---|
| 637584 | 8/1983 | Switzerland | 440/6 |

*Primary Examiner*—Stephen Avila

[57] ABSTRACT

Electric powered watercraft that lack an open-hull capsizable design utilize a low energy density heavy power supply for stabilization. The power mass is enclosed in one or two torpedo-like structures that are mostly or completely submerged. The structure(s) are combined with at least one enclosed float, preferably of convex shape. A platform is spaced above the float(s) via struts that allow wave energy to pass through the watercraft rather than collide with large vertical surfaces. The design also minimizes wake formation. This configuration of a low-energy density power supply, particularly within tapered hull(s) is useful for electric powered houseboats and personal pleasure craft that can withstand stormy conditions more easily than equivalent sized open vessel designs.

19 Claims, 8 Drawing Sheets

ADVANTAGEOUS USE OF BATTERY MASS IN ELECTRIC WATERCRAFT

This application claims benefit of Provisional Application Ser. No. 60/076,002 filed Feb. 26, 1998.

BACKGROUND OF THE INVENTION

One problem with the concave "vessel" design of watercraft is that excess volume is required above the water line to accommodate unexpected cargo weight and to prevent catastrophic failure from water spilling into the vessel. That is, an open displacement vessel must have a large volume that increases from its bottom to top and presents a vertical or concave shape, which creates a maximum of friction at the water surface. Unfortunately, such a concave hull efficiently transmits and receives energy to and from the water surface. As a result, such watercraft lose much energy by wake formation and are easily rocked by waves.

Because of its hull shape, a vessel watercraft creates a wave (wake) simply by moving. This wave increasingly impedes boat movement as the boat acquires velocity, and becomes a standing wave at what is known as a limiting "hull-speed." This wake represents lost energy, which is flung away from the watercraft and hits beaches, other boat hulls and other structures. Besides greatly lowering watercraft speed, the wake forces the watercraft to adopt low speed within residential waterways and harbors to minimize its damage. Thus, the hull vessel design also wastes time and frustrates watercraft owners who desire quick transit of waterways and harbors, but are limited by the hull displacement problem of their boats.

The traditional vessel hull absorbs wave energy well. When a water wave meets a vertical or concave hull at air-water interface, some of the wave energy transfers to the hull. This energy slows boat movement, and can rock the boat when it is not moving, which can sicken the occupants. Consequently, a personal watercraft such as a pleasure boat less than 30 feet, and particularly personal trailorable watercraft (that is, less than 25 long) may become unusable if considerable wave activity is present. Waves only 2 or 3 feet high impart too much energy to such vessel hulls and even can fill the hull with water.

To overcome these vessel hull problems a boat is simply made larger. However, his solution is impractical for personal watercraft, especially trailorable watercraft that are limited in size by the dimensions of vehicles that can travel behind a car or truck on a highway. Furthermore, a watercraft, even in a body of water protected from the ocean, such as the Chesapeake Bay in the U.S. or Kobe Harbor in Japan can encounter such waves, and should be much larger to handle such waves.

One watercraft design that departs from the traditional vessel approach is a pontoon boat. A pontoon boat has a passenger compartment, or "platform" that sits upon two or three elongated air filled floats called "pontoons." A pontoon boat however, relies on a large flotation capacity of pontoons, which present a vertical surface at or near the water line. The vertical pontoon surfaces both absorb and generate waves and share generally the above-recited drawbacks with vessel designs. Furthermore, the pontoons create surface waves and typically are in a straight, non-optimal shape. Another disadvantageous feature of the pontoon boat design is that a motor is added between the pontoons (a separate source of drag) and is not integrated into the design itself. Yet another problem with a pontoon boat design is that most of the boat mass including the motor and power source is above water. A pontoon boat has a high center of gravity, which worsens the instability problem, particularly from waves, which collide perpendicularly to the elongated floats.

Houseboats are similar to pontoon boats and, unlike many open hull designs, have a high center of gravity above their center of buoyancy as described, for example, by Russell Conder, Handmade Houseboats, McGraw-Hill 1992 page 57. Because of its high center of gravity, a houseboat, like a pontoon boat generally is more susceptible to wave activity and is not usable in areas of high wave activity. Thus, a severe limitation of a pontoon design is that more of the weight is above the float than is desirable from the viewpoint of stability. Accordingly, it is important to keep the platform portion as close to the water surface as possible, in order to keep the center of gravity low.

Another design that deviates from the open hull approach is a semi-submerged catamaran or SWATH ship as, for example, described by Masuyama of Tokyo in U.S. Pat. No. 5,694,878, by Yoshida of Kobe in U.S. Pat. Nos. 4,763,596 and 4,986,204, and by Lang of California in U.S. Pat. Nos. 3,830,178; 3,897,744; and 4,944,238. The semi-submerged cargo ships described in these patents consist of submerged bodies having struts that support a hull, which can be convex. The submerged bodies tend to absorb less wave energy than does a concave or vertical displacement hull and also create less surface wave disturbances. However, these ships are not personal trailorable watercraft but have been exploited generally as huge ships designed for the open ocean. The inventors discovered that these ships have disadvantageous features that prevent their use as personal watercraft, as described below.

A semi-submerged catamaran as described, for example, by Masuyama has "no reserve buoyancy, so it needs a special lifting/diving system such as water ballasting equipment or lifting/diving plates in order to navigate or lie to with ample stability" as described in column 1 lines 41–44 of U.S. Pat. No. 4,763,596. More particularly, this and other patents in this area focus on the need to control the submerged parts of the boat because they do not have sufficient reserve buoyancy to automatically right the boat. Such complicated systems presented by these disclosures are not amenable to personal watercraft design, and certainly are not designed to prevent dipping of the boat in response to large shifts in cargo weight during boat movement.

The semi-submerged catamarans unfortunately also have a high center of gravity, particularly when loaded, and a large ratio of above-water volume to below-water volume. As explained above, these factors create instability, both to wave motion perpendicular to the boat and to perpendicular wind motion. A representative example of such a semi-submerged catamaran is shown in U.S. Pat. No. 4,174,671. As seen in figures of that patent, the majority of the craft volume, and particularly, the majority of the craft mass is above the water. Unfortunately, the semi-submerged catamaran has a high center of gravity that significantly exceeds the center of buoyancy and is not designed to carry a load that suddenly may shift position during transit. A personal watercraft on the other hand typically contains much reserve buoyancy and should have a center of gravity that is lower than the center of buoyancy to handle this problem. Thus, semi-submerged ships do not need a means to correct for catastrophic movements during travel, due to sudden and severe changes in loading.

Furthermore, a passenger on a large ocean going SWATH watercraft may represent small portion of the total mass and does not shift the loaded watercraft's center of gravity appreciably. A personal watercraft in contrast, is very sensitive to such changes in center of gravity. The inventors discovered that the traditional SWATH design is not amenable for use in personal (trailorable) sized watercraft of typically less than 30 feet long and particularly less than 25 feet long.

The drawbacks of the traditional vessel displacement hull design are worsened when combined with electric propulsion systems. Electric boats (and their cousins, fuel cell powered boats) require a heavy and bulky power source. The great weight of the power source requires yet a larger hull to displace a larger volume of water to keep the boat afloat. Thus, the development of electric watercraft technology in particular is hindered by the vessel hull problem. In fact, the vessel hull drag prevents economical use of electric motors for even moderate speed (above 8 mph) boating. This unfortunate state of affairs is a well known problem with electric boats, as, for example, stated in DOUGLAS LITTLE, ELECTRIC BOATS, THE QUIET HANDBOOK OF CLEAN, QUIET BOATING, (International Marine, 1994) on page 33 (referring to propeller design): "In the case of the electric boat, high speed-above 10 mph—is one factor that can be dropped immediately." Clearly, new designs are needed for wide acceptance of electric boats as general-purpose personal watercraft.

Efforts to overcome the hull problem for electric boats (and other boats) have emphasized streamlining the hull to make a larger middle section with tapered ends. However, hulls designed for semi-submerged catamarans, and their cousins, the submarine, generally contain straight conical midsections, which are not ideal, as explained by Guevel and Bardey, who describe an improved missile-like hull that gives constant pressure along its surface (U.S. Pat. No. 5,024,396). Other attempts to avoid inefficiencies from water contact with hulls are found in U.S. Pat. Nos. 5,544, 610, 4,571,192 and 5,481,996. Heavy power supplies such as electric batteries and hydrogen fuel cell, when installed in an open hull watercraft, on the other hand, interfere with hull streamlining because of this greater need for both a bigger boat to hold the power supply and a reserve buoyancy for safety, as described above.

There is no comprehensive combination of these approaches that plays off the disadvantages of using heavy batteries or another low energy density power source with the other. In particular, no design strategy has successfully used the large mass and volume requirement of electric (or fuel cell) batteries as an asset, instead of a demerit, in a boat structure. Finally, there is no sufficient design for an electric powered and trailorable watercraft that can withstand moderate wave activity such as 2 feet high waves, without going to a larger vessel. A solution to these problems would open up new areas of boating to those that cannot buy or use the much greater size boats needed where such wave activity is present.

SUMMARY OF THE INVENTION

The inventors discovered a way to exploit the heavy battery problem in an electric boat design that simultaneously (i) allows use of massive battery power for a small watercraft, (ii) stabilizes the watercraft, (iii) decreases its center of gravity, (iv) decreases resistance to wave action and (v) decreases friction to boat movement.

Pursuant to their investigation, the inventors further discovered that arranging one or two primarily submerged closed hulls with surface piercing struts works poorly for a personal watercraft but that they could make the platform shorter or add one or two floating skis to provide the needed stability. In sum, the inventors discovered these techniques could alleviate the twin problems of absorption and creation of energy from surface waves, and that further features could be added as desired for yet further improvements to watercraft that contain a heavy power source such as batteries.

In one embodiment, the invention is a watercraft, comprising: (a) two elongated, partially submerged support members having convex upper surfaces and struts attached to the upper surfaces; (b) a propulsion unit and a low energy density power source within each support member; and (c) a platform attached to the tops of the struts and positioned above the support members, the platform length being less the support members by at least the mean strut length, wherein the support members are positioned parallel to each other, the struts position the platform above the support members to allow at least some wave motion to pass unimpeded between the support members and the platform, and the low energy density power source comprises at least 10% of the watercraft weight.

In another embodiment, the invention is a watercraft, comprising: (a) one elongated, submerged support member having a convex upper surface; (b) a propulsion unit and a low energy density power source within the support member; (c) at least one floating ski positioned parallel to the support member; and (d) a platform wherein the support member and the at least one floating ski are positioned parallel to each other with the support member lower than the ski and hold the platform above the water surface via struts to allow at least some wave motion to pass unimpeded between the water surface and the platform, and wherein the low energy density power source comprises at least 10% of the watercraft weight.

In yet another embodiment, the invention is an electric powered watercraft having a center of gravity at or below its center of buoyancy, comprising two laterally arranged and elongated floats with convex surfaces, a centrally positioned and elongated submerged battery compartment and a platform held above the floats and the battery compartment by struts.

BRIEF DESCRIPTION OF THE DRAWINGS

FIGS. 5a and 5b show a passive deflector means to prevent complete submersion.

FIGS. 8a and 8b show a preferred floating ski shape.

DETAILED DESCRIPTION OF THE INVENTION

The inventors have searched for boat hulls that do not present a concave or vertical shape at the water surface and realized why such hulls are not popular for personal watercraft. Conceptually simple, the open hull design watercraft has a large reserve buoyancy volume, which allows dramatic changes in loading of a personal watercraft while moving. This buoyancy volume, however, requires a large hull that must be vertical or concave at the water surface. That is, such watercraft are bigger above the water surface than below, and this feature encourages transfer of energy to and from the water surface. Furthermore, pontoon watercraft have this problem. In reviewing the SWATH design as an alternative, the inventors discovered that these ships are very large with platforms that extend generally above the total lengths of their dual support members and furthermore, are top heavy. Thus, the SWATH design was found to have limitations for use in small watercraft, partly because a passenger standing on a platform that already is spaced above the water surface greatly increases the watercraft's center of gravity.

The inventors discovered that they could alleviate these problems by placing heavy batteries (or other low-energy density power source) within an enclosed, elongated convex hull, and then to combine at least one such hull, which sits low or completely in the water, with one or more features outlined herein for improved watercraft stability. The inventors experimented with this concept by building an eight-foot model SWATH type of personal watercraft but quickly learned that an additional feature is needed to employ the SWATH concept for personal watercraft use. Because of their much smaller sizes, personal watercraft have a greater tendency to tip in response to an occupant having a specific gravity that is proportionately higher on the platform compared with that of a conventional seagoing SWATH ship.

The inventors studied the use of primarily submerged support members and learned to combine the support member(s) with a shortened platform and/or floating skis for stability. In the case where batteries are placed in a single support member, the inventors discovered that good performance is achieved by combining the single support member with at least one, and preferably two floating skis laterally positioned to the support member. When the single support member is low in the water (preferably more than 90% submerged) and contributes to a low center of gravity, it advantageously may be combined with 2 floats such as pontoons having convex surfaces, instead of 2 skis to provide positive buoyancy.

Basic Features: (a) Heavy Power Mass within a Closed Support Member Spaced Below the Water Surface Via Struts and (b) Shortened Platform and/or Floats such as Skis for Stability (a) Use of Low Energy Density Power Mass for Stability According to the invention, a low energy density power source that represents a large proportion (more than 10%, preferably more than 20%, more preferably greater than 30% and even more preferably greater than 50%) of the total watercraft weight is placed within at least one closed hull support member having a convex surface, and a platform holding the occupants (or other cargo) are held above the support member(s) by struts. This essential feature of the invention minimizes contact of watercraft surfaces with wave energy by: (1) presenting a convex shaped surface at the top of each mostly submerged support member such that this top surface approaches a horizontal and interacts little with wave motion; and (2) allowing waves to pass through the craft by placing the non-submerged portion of the watercraft on struts having little vertical surface to interact with water, such that the struts maintain a space between the top surface of the submerged support member and the bottom surface of the platform. The submerged support member(s) furthermore are elongated and shaped to alleviate surface wave formation and further contain(s) the motor/propeller that operate in the same vector as the axis of the support member, and do not separately disturb the water.

The basic feature of placing a massive energy source in a support member/propulsion unit below the platform may assume one of two basic conformations to exploit the large the mass to stabilize the craft. In one, two support members are used that preferentially are not completely submerged but have positive buoyancy, hereafter-termed "Double Support Member Configuration." In the second, one support member is used that is completely submerged and is combined with floating skis for lateral stability, hereafter termed "Single Support Member Configuration."

(b) Shortened Platform and/or Floats such as Skis

Commercialized SWATH ships generally have platforms that are large with respect to a passenger and thus have dimensions that dwarf the centers of gravities of moving occupants. In contrast, a watercraft according to the invention has a length that is proportionately smaller with respect to an occupant. In particular, a platform according to preferred embodiments is shorter than the length of the support members, as shown in the figures. In one embodiment the platform is shorter on both its fore and aft sides above the support member(s) by at least the distance of the mean support member length. By way of example, if two support members 15 feet long are used with 1-foot long struts, then the platform is no more than 13 feet long. In another embodiment, the platform is shorter by twice the mean strut length or, according to this example, no more than 11 feet long. The term "mean strut length" as used here means the average spacing between the support member(s) and the platform, the spacing being created by the struts. The actual platform dimensions should reflect the anticipated passenger load and weights such that if a tall person is allowed to move freely throughout the platform area, that area should be made smaller, particularly in the fore and aft dimension.

According to another embodiment, instead of limiting the platform size, at least one float such as a ski is included parallel to the support member(s) for increased stability. In this context, a ski is preferred where high speed is desired. In such case the support member(s) should provide some buoyancy for the platform. When high speed is not a concern, such as for a houseboat, a single support member, particularly with strong net negative buoyancy may be combined with two lateral floats such as pontoons that will not readily hydroplane at higher speed.

In most embodiments one central ski is preferred between two support members and, if one support member is used, two floating skis, one on each side of the support member is preferred. In yet another embodiment one support member is combined with one floating skis located on a side determined by the rotation of the propeller within the support member. If the propeller rotates clockwise for forward boat movement, the support member will tend to twist counterclockwise and the floating ski is positioned to the left of the support member. If a propeller is chosen that rotates counterclockwise then the floating skis is positioned to the right of the support member.

Each ski preferably has a flat bottom and provides flotation to the platform when the watercraft is at rest. Preferably, the support member provides some buoyancy and each skis provides less than 35%, more preferably less than 20% and even more preferably less than 10% of the buoyancy that holds the platform (plus the passengers/cargo) above the water surface when not in motion. A minimum percentage of buoyancy is most preferred when little wave activity is present and in any event is desired to allow for minimum sized skis. During forward motion, the skis skim on top of the water surface. In one embodiment the skis do not contribute buoyancy during forward motion and the completely submerged support member provides this force. According to an embodiment, the support member buoyancy is controlled by pumping air or water in or out of it such that during rest, the support member contains greater mass than during motion. During operation according to the latter embodiment, the support member buoyancy and/or the floating skis' buoyancy preferably is increased immediately prior to or during initiation of forward movement. During high wave activity, the support member and/or the floating skis buoyancy preferably is decreased by ballasting with water to enhance stability.

Embodiments of the invention include the use of a single support member, in which case at least one floating ski is in included and the platform is held above the skis(s) and the support member by struts. Embodiments also include the use of two support members, which may further include a skis that is centrally located between the support members, as outlined below.

The Double Support Member Conformation: In this conformation, the support members contain heavy power sources and ride low in the water. To help stabilize the watercraft against wave action, at least 35% of the support member(s) containing the power source should be below the water line. Preferably, at least 50% is submerged and more preferably more than 65% and even more than 85% is submerged. The principal limit to submersion according to one embodiment is that a small reserve of buoyancy is required to resist sudden weight shifts in the watercraft (such as in the platform). However, if a satisfactory means of preventing accidental excess submersion is used (as, for example, described herein) at least 85%, and preferably more than 90% submersion is preferred.

Figure 6:
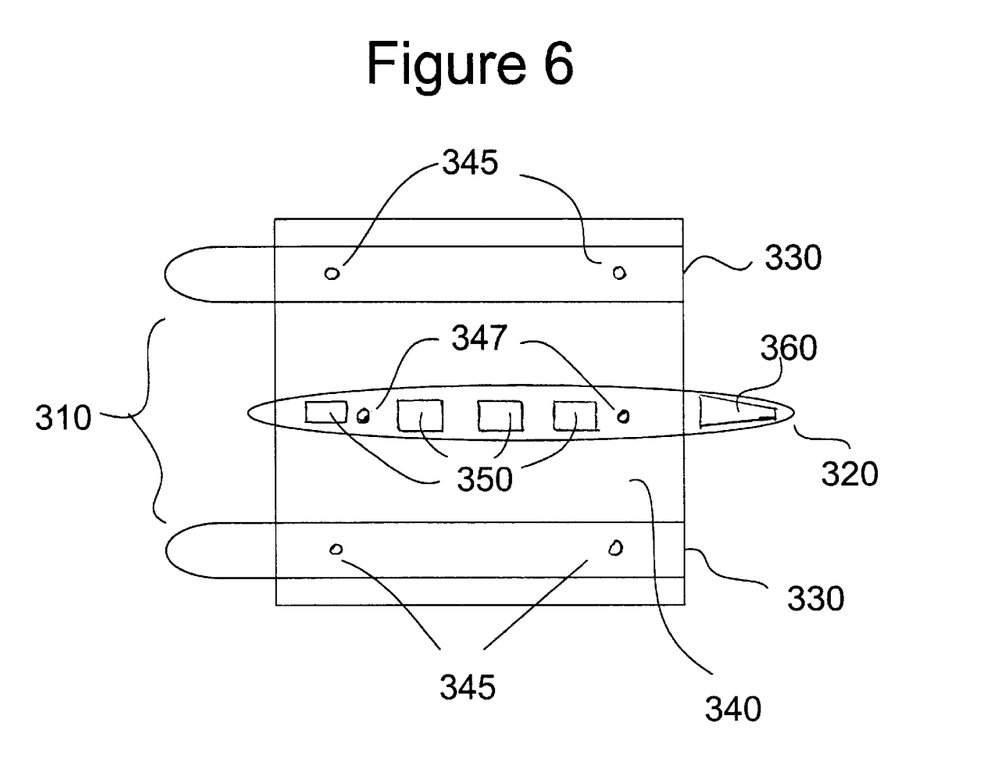
FIG. 6 is a top view of a watercraft having a single support member with 2 lateral floating skis.
Figure 7:
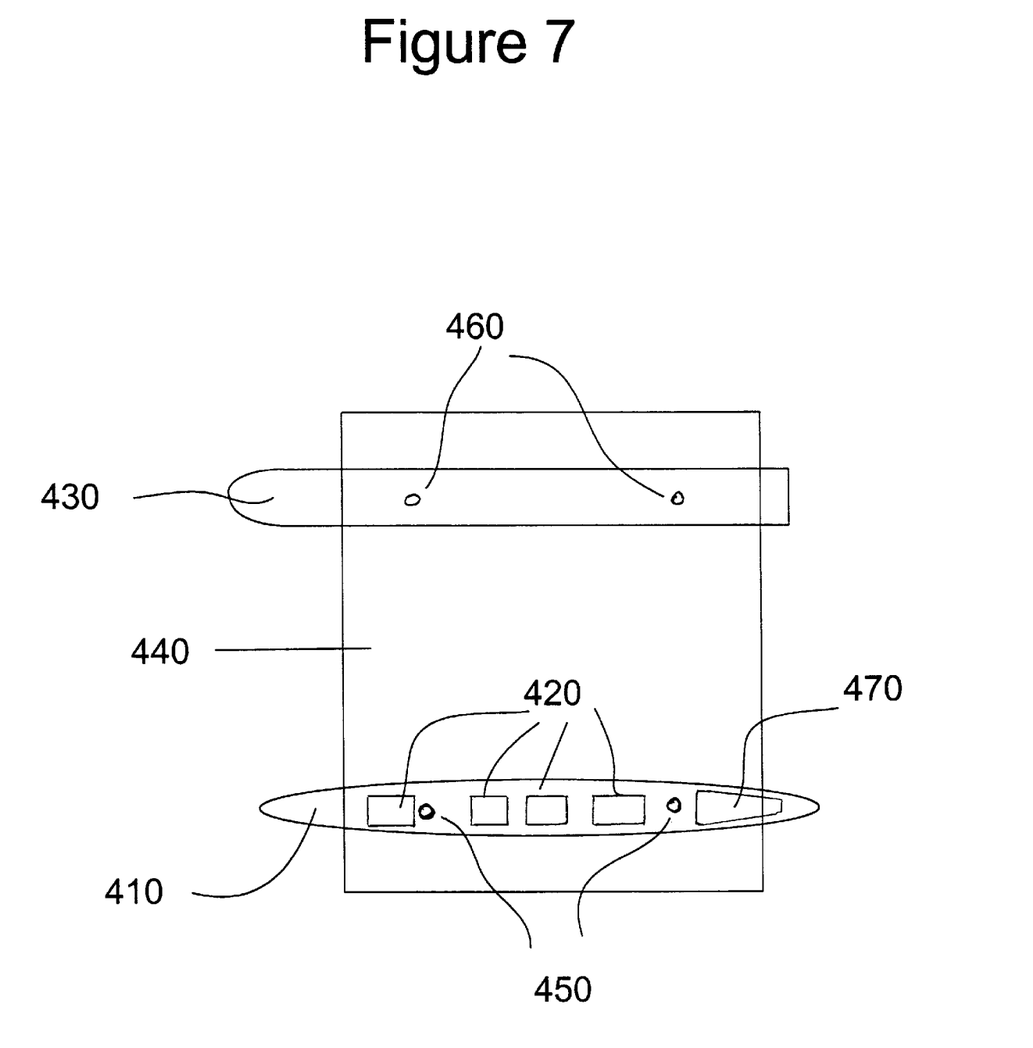
FIG. 7 is a top view of a watercraft having a single support member with 1 lateral floating ski.

The Single Support Member Configuration: According to another embodiment of the invention substantially (more than 50%) all of a support member is submerged, and the watercraft further comprises at least one floating ski for stability, as described below. When one floating skis is used, the support member preferably is submerged about 50% and contributes at least half of the total buoyancy, the skis contributing the remainder, as shown in FIG. 7. When two skis are used, the support member preferably is completely submerged, as shown in FIG. 6. In either case, the support member contains batteries, propulsion unit and optional reserve buoyancy to hold up the platform as shown in these figures. The support member is attached beneath the center of the platform in FIG. 6, and beneath the left side of the platform in FIG. 7, via struts and a floating skis is attached beneath the other lateral side(s) of the platform.

In both single and double support member configurations, the struts, which hold up the platform, allow the platform footprint area above the water to exceed the footprint area of the watercraft that contacts the surface of the water. In contrast, the usable area of a vessel type watercraft has a footprint that is similar to the area of the watercraft that is in contact with the water surface. This is because the displacement vessel structure contacts the entire water surface area (is interposed between the water and the atmosphere) at every point below the area where an occupant may use the watercraft (i.e. the platform). Preferably, a watercraft in accordance with the invention has a platform area that is more than ten times the area of the watercraft in contact with the water surface and more preferably at least one hundred times.

Exploit the Basic Features with Further Combinations

Preferably, additional features of the invention are combined to the watercraft, to take advantage of the large weight of the power mass and further stabilize the watercraft, as reviewed in items A through L below.

Figure 1:
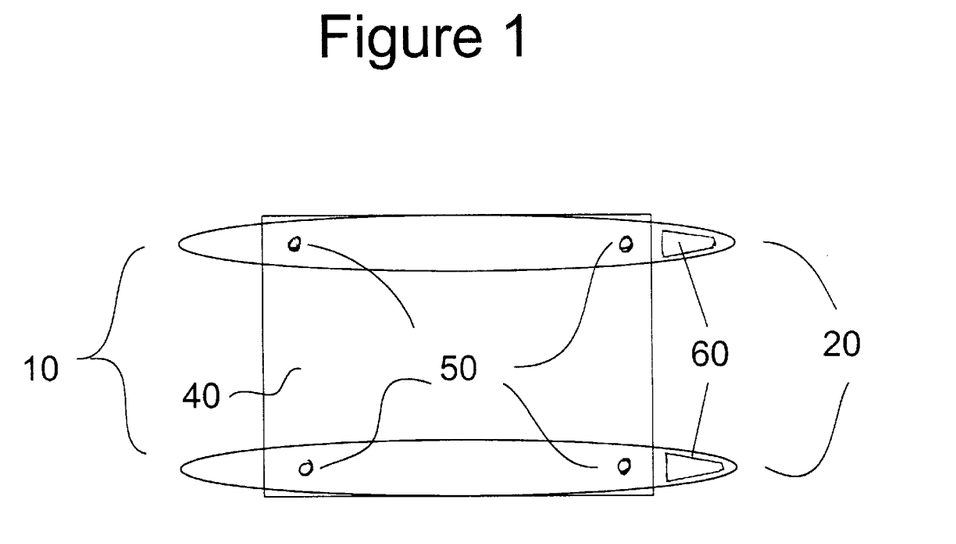
FIG. 1 is a top view of a watercraft having a short platform held above two longer support members by 4 struts.

A. Propeller Placement within the Support Member Another advantageous feature is placement of a propulsion unit or units inside the long axis of the support member(s) such that its propeller (or water impeller or other means of moving the watercraft) disturbs water in the same vector and same location as the submerged portion of the watercraft as shown in FIG. 1. Electric boat propulsion is particularly well suited for this embodiment because an electric motor does not require air and can be cooled by placement in contact with the water.

B. Automated Buoyancy Compensation The amount of submersion of the support member and/or struts can be detected automatically and controlled by a buoyancy compensator after sensing submersion of the watercraft, and/or whether the watercraft's attitude is improper (e.g. the bow being lower than the stern during forward movement). Buoyancy compensation then can be carried out automatically. Watercraft buoyancy preferably is controlled by adding or removing air from the submerged portion, or by adding weight to the watercraft, or both. One advantageous embodiment is to include an air bag in the submerged portion and to transfer air between this bag and the atmosphere as needed to control watercraft submersion.

C. Hydrodynamically Shaped Support Member(s) A support member provides buoyancy (which optionally is controlled) and thereby supports the portion of the watercraft that exists above the water line. To minimize water disturbance the support member may be in the shape of a log, or more preferably, a cigar as shown in the figures. Most preferably, the support member should have a contoured surface throughout, to minimize boundary layer detachment and cavitation at higher speeds, such as above 10 miles per hour. One preferred shape in this context is a rounded central portion tapered along a curve defined by a Fredholm equation of the second kind so that a pressure coefficient remains constant at all points on the central portion, as described in U.S. No. 5,024,396.

Especially preferred is a screw propeller that extends from a surface that is roughly continuous with the curvature of the support member which it comprises and that does not extend out more than the maximum radius of the support member at its largest radius, in order to minimize the water disturbance. In other words, the screw propeller has a hub or central body that is continuous with the support member. The part(s) of the propeller that stick out of the water extend from this continuous surface. More preferably, the screw propeller focuses water at a point immediately to the rear of the propeller axis. In other words, the propeller gathers water near the immediate area of the support member surface and creates a higher pressure immediately to the rear of the support member, where the rushing water that travels along the support member surface tends to come together. For example, a hull tapered along a suitable curve and which has a maximum diameter of 20 inches would be matched with a screw propeller having a hub that fits this same curved hull surface. In this case the fins extend up to 20 inches diameter.

For best stability, two or more members should be used parallel to each other. Each member preferably has a taper or increase in diameter from the anterior point (leading edge) towards the central portion, and a gradual decrease in size or taper from the central portion to the posterior point (trailing edge) as described above. Preferably, the posterior point has a diameter approximately equal to the motor diameter, and a motor is present at this point in each member. In this case, a propeller is preferred that focuses the expelled water to a focal point directly behind the long axis of the support member. Since a small portion of a support member is desired above the waterline, the top center of the member along its long axis may be slightly raised, as mentioned above under "convex surface," to provide this reserve buoyancy.

D. Shaped Struts for Low Wave Interaction Struts of the present invention utilize the buoyancy of primarily submerged support members to hold up a platform, or other unit such as a photo voltaic array. Struts typically extend from a support member by 1 foot, preferably between 1–3 feet, and could be more than 6 feet in large bodies of water. However, it is best to keep the distance short to maintain a center of gravity low. Preferably the center of gravity is lower than the center of buoyancy, and telescoping struts can be used to lower the center of gravity as needed.

The "vertical" arrangement of the struts allows the struts to hold up the unit that is to be kept out of water. One or more struts can extend away from a perfect vertical and a swept back design consistent with streamlining is acceptable. The primary consideration in size and shape is that the strut(s) hold the upper unit above the support member(s) such that most of the wave action passes underneath the unit without interacting (imparting energy to) a watercraft surface. Thus, if the strut(s) are 2 feet long, the watercraft can be used in a body of water having at least 2-foot waves. Preferably, strut length exceeds the maximum anticipated wave height.

The struts are designed having minimum cross sectional surface area in order to present a smaller target for wave action. Preferably, a strut is a pole with a leading edge for lower friction during movement. The struts preferably have an average diameter (i.e. as measured along the length between the submersible members at the water surface and at the highest location where waves typically impact) that is less than 5 times the distance from a submersible member and the platform. In one embodiment the platform holds a photo voltaic array and the struts terminate at their top with the horizontal platform that holds the photo voltaic unit.

E. Movable Struts In one embodiment the strut(s) can be extended as desired, automatically or manually. Such extension or retraction may be done telescopically in response to wind and/or wave conditions and can cause the center of gravity to become lower than the center of buoyancy. Such extension or retraction also is desired when loading or unloading the platform, to match the elevation of a dock. Buoyancy of the support member(s), in a related preferred embodiment, is controlled to match the elevation of a dock. In extreme cases both support member buoyancy and strut length are altered to control platform elevation.

F. Combine with a Means to Prevent Platform Submersion In a preferred embodiment that does not use skis as described immediately above, a means is provided to prevent the watercraft from dipping into the water (diving) while moving. For example, when moving, a sudden shift in weight towards the front of the watercraft may cause the watercraft to submerge further than desired, particularly if the front of the submersible portion members becomes angled down with respect to the angle of attack into the water from their leading edges.

Submersion of the watercraft platform can be prevented during normal, non-diving use by adjusting the buoyancy such that the watercraft is positively buoyant after loading, to handle sudden shifts in weight. Protection against undesirable submersion also can be prevented by other means, such as controlling the attitude of the watercraft during movement, with a horizontal rudder as exemplified in FIG. 4, with a passive deflector as exemplified in FIG. 5, or with a bow-mounted propeller having a thrust that inclines.

Other means to control sudden or gradual movement down into the water are contemplated and a representative sample is presented here. One means is to monitor for changes in watercraft depth and compensate either by stopping the watercraft, shifting weight distribution in the watercraft, or steering the watercraft to compensate the vertical movement.

Monitoring for changes in watercraft depth (or changes in angle of attack, which lead to changes in watercraft depth) can occur by any number of ways that are known. Preferred are electronic means. For example continuous monitoring of depth can be carried out galvinometrically, i.e. by measuring conductivity between vertically arranged electrodes on one or more struts. When the water level rises, either by immersion, or by high wave activity, such immersion or high wave activity can be electronically detected by changes in conductivity between the electrodes.

A skilled artisan can easily see various ways to arrange electrodes as well as determine suitable algorithms to decipher patterns of electrical conductivity as representing longer-term submersion versus regular wave activity. Conductivity measurements can be conducted on the same strut, between electrode(s) on a strut and a submersible member, and between two different struts. By obtaining a large amount of data, a computer, for example, can determine whether to shift ballast to compensate, adjust motor speed, adjust motor thrust vector (rotate motor to thrust more down or up), adjust a rudder to control vertical position in the water, and the like.

Other means to control submersion depth do not require monitoring for changes in watercraft depth. For example, a mechanical force deflector can be used that hits the water surface at an angle when the watercraft submerges too far. FIG. 5 shows a mechanical force deflector attached to a strut. In this preferred embodiment, the force deflector is near the front of the watercraft. In another embodiment, this force deflector swivels and is linked, electronically or mechanically (FIG. 4), to a vertical rudder such that when it hits the water, the rudder compensates by forcing the anterior portion of the watercraft up.

Yet another means to control submersion depth is to include buoyant material in the bottom of the platform. According to this embodiment when the platform contacts the water, it acts as a float.

Yet another means to prevent undesired submersion is to use a vertical rudder or hull design that constantly forces the watercraft to submerge during forward movement of the watercraft. When the watercraft stops, this downward force also stops, and the watercraft drifts up.

In practice, a combination of controls are preferred for ensuring that the watercraft does not completely submerge. For example, a platform that contains buoyant material, and a vertical rudder linked to a force deflector can be used simultaneously. Of course, a preferred means of preventing unwanted complete submersion is through buoyancy adjustment of one or more support members. Typically, an air bladder, or hollow compartment of the support member contains traps air, and the amount of air is adjusted to provide a desired level of buoyancy.

This combination allows greater submersion of the support member(s), which stabilizes the boat, while presenting catastrophic failure. This feature allows a smaller boat (having smaller flotation) to be used in comparison with regular open vessel or pontoon designs.

G. Flat Bottom and Convex-Shaped Floating Skis The use of a single support member is sometimes preferred such as when complete submersion is desired to place the propeller further below the surface, or when the added friction of a second support member is undesired. In this instance, one, or more preferably two floating skis are attached by strut(s) to the bottom of the platform as shown in FIGS. 6 and 7. Watercraft according to the invention that contain two support members, particularly where the support members are equal to or less than 15 feet long preferably contain at least one floating skis as shown in FIG. 3.

In both cases, a skis contributes preferably at least 10% of the total buoyancy and most preferably the skis' buoyancy is greater when the watercraft is not moving than when the watercraft is moving forward.

Each ski preferably has a rounded leading edge. A convex shape as described for the support member, is preferred for the skis as well, and the skis preferably has a generally flat bottom (i.e. suitable for the skis to ride above the water surface during motion) as shown in FIG. 8. Thus, the convex shape float allows the skis to sit in the water during rest while interacting minimally with surface waves for greater stability. The generally flat bottom can be modified as known to the skilled artisan, for example by adding a vertical fin or ridge. During forward motion, the skis skim on top of the water surface by virtue of the rounded leading edge and the flat shaped bottom and should have minimal mass.

H. Offset a Single Skis with Two Support Members According to another embodiment, a single floating skis as described above is located between two support members and is offset towards the front of the craft as depicted in FIG. 3. The inventors empirically discovered that adding this skis, particularly offset to the front, gives two benefits. One, the skis allows greater load carrying capacity of the craft compared to the craft without the skis. For this benefit, it is important that the rear end of the skis extend under the platform. Two, the skis allows greater stability and thus longer struts to be used without tipping the craft.

I. Adjust Skis Buoyancy for Optimum Stability and For Steering According to one embodiment, support member buoyancy is controlled by pumping air or water in or out of it such that during rest, the support member contains greater mass than during motion. A water pump is preferred for this purpose and may, for example, be located within the skis itself or the support member, with a hose connecting the pump to a ballast reservoir within the skis. Preferably, the ballast reservoir is at least 10% by volume of the skis and the increased in mass is distributed either in the middle of the skis or along its length.

In a preferred embodiment, the optional skis ballast is used for steering. In this case, the ballast preferably is located in the front half of the skis, and more preferably close to the leading edge. In operation, a turn left is accomplished by adding weight to the front of the left skis while the watercraft moves forward. A turn right is accomplished by adding weight to the right skis. Other combinations and permutations, such as for example, removing weight from the right skis, or shifting weight from the right skis front to its rear to turn left, readily will be apparent to the skilled artisan.

J. Electric Storage Batteries Yet another preferred feature is electric propulsion, using an energy storage unit, such as a lead-acid battery, or fuel cell, inside a support member(s) and a propeller at the stern end of the support member. Such power sources typically yield about 1-kilowatt hour per 50 to 100 pounds of mass and limit the amount of power usable for a small craft. For example, a 15-foot long open hull watercraft cannot reasonably accept 300 pounds of battery without serious stability problems (danger of sinking with passenger(s) aboard). Accordingly, such short watercraft are limited to either small electric motors or short distance uses. The massive volume and mass of the energy storage unit available according to the invention allow greater motor size and or usable range, while, at the same time, shifting the center of gravity lower and not greatly increasing watercraft drag.

K. Combine with Photovoltaics for Long Voyages One embodiment for use in the open ocean is a single support member having lateral stabilizer fins, and one or more struts that hold up a photo voltaic array above the water for supplying energy to the motor. Most preferred is a strut(s) that are at least 6 feet long, more preferably at least 9 feet long. Also preferred is a foldable photo voltaic array for storage in an unextended form during storm activity.

L. Place a Center Support Underwater with Two Parallel Floats at the Water Surface The embodiment of a central support member with two parallel floats such as skis or pontoons is particularly useful for larger watercraft such as a houseboat. This embodiment alleviates the problem of a high center of gravity compared to the center of buoyancy. According to this embodiment a low energy density power mass is placed into a, preferably tapered but optionally straight, central support member that has great negative buoyancy and is completely submerged. In one embodiment this central support member is completely submerged and may be submerged by a small distance, such as 6 inches or 1 foot or more, for a large sized craft such as a houseboat. Preferably the mass of the support member is at least as much as the platform. The dimensions thus can be easily arranged to adjust the center of gravity to be at or below the center of buoyancy.

The two parallel floats provide buoyancy for the platform. In preferred embodiments, for greater stability the parallel floats also provide buoyancy to counteract a massively weighted central support member. In a particularly preferred embodiment, the central support member contains a large propulsion unit and the entire low energy density power source. The floats in this case preferably are tapered with a convex surface to allow low resistance in the water. By way of example a small houseboat according to this embodiment may have a 25 foot long center support unit that is conical and tapered at each end, as shown in the figures and positioned so that the top of the support unit is one foot below the water and the unit has a 3.5 foot radius at its middle. Two thousand pounds of lead acid batteries and a 25 horsepower motor are placed within the propulsion unit. The parallel floats are each spaced 7 feet apart from the support member (total width of 14 feet) and, like the support member, also are tapered with a convex surface. The floats are 25 feet long. Both the floats and the support member hold up a platform with rooms in it, by a number of struts that are 1 feet long.

A houseboat with this conformation will have low resistance to moderate speed motion. Most importantly, the center of gravity, depending on the height and weight of the platform with rooms, will be close to or even below the center of buoyancy. Thus, compared to a houseboat of the same dimensions made from two pontoons, a houseboat according to the present invention will be more resistant to wave action.

Definitions of Terms Used

The following definitions are provided to assist the reader in understanding how to make and use the invention and to understand the scope of the claims.

Support member means an elongated closed structure that sits in water and presents a convex shape at its upper surface. The support member is submerged at least 40% by volume, preferably at least 50%, more preferably at least 75%, and depending on other control structures that may exist on the watercraft, preferably is more than 85% submerged. The support member may be buoyant and contribute to holding up a platform. A support member, in every embodiment is connected to the platform by one or more struts and the support member contains a low energy density power source.

Convex means curved outward, as the exterior of a sphere, but may have discontinuous and flat portions as long as those portions do not present a concave surface that is capable of holding water that may fall upon it.

Strut means an elongated support, existing between and connecting a support member to an overhead platform. A strut has a mean diameter that is less than 20% its mean length. The length of each strut (distance between support member and platform) preferably is at least 6 inches long. In some embodiments the struts are more than 9 inches long and in other embodiments the struts are more than 1 foot long. In yet other embodiments the struts are more than 3 feet long. The struts hold up the platform so that at least some wave energy can travel unimpeded under the platform. The term "at least some wave motion to pass unimpeded" means that at least 20%, preferably more than 40% and more preferably more than half, and most preferably more than 75% of energy from a wave perpendicular to (and having an amplitude equal to or less than) the support member travels unimpeded.

Propulsion Unit is a motor that turns a propeller or impeller, and is linked to a source of energy such as a battery, gas tank, hydrogen fuel cell, and the like. Most preferred is an electric motor, combined with solar electric energy, with a battery backup for times of low solar radiation. Other motors, such as hydrogen powered, or diesel powered motors are acceptable. In the case of diesel or another motor that burns oxygen, the motor preferably is within a support member and a snorkel extends above the surface to bring air to the motor. Also preferred is a hydrogen motor that uses atmospheric oxygen to combine with hydrogen stored in a support member, and compressed gas for use during diving.

Preferably, a propulsion unit is located within the trailing point of one or more submersible members, as shown in the figures. Most preferably, a propeller is at the extreme tip of each member, and has a diameter that is not greater than the diameter of the fattest part of its member. This orientation more closely matches the location and vector of the propulsion unit's perturbation on the water such that total perturbation of the water is minimized.

Platform is a horizontal support held above the submersible portion (i.e. one or more support members). Preferably, the platform extends far enough above the submersible portion such that most (more than half) of the waves underneath the platform substantially pass between the submersible portion and the platform. The platform preferably is flat and in that configuration presents low wind resistance. The platform is part of the watercraft that a passenger rides on or in and preferably has seat(s) attached. The length of the platform (in the same dimension as the long dimension of the support members) preferably is less than 85% the length of its support member(s), more preferably less than 75%, and even more preferably less than 60%. In the inventors' experience, the best length is partly determined by how long the struts are and a longer strut requires a shorter platform to maintain stability. According to an embodiment the platform length is less than the support member length minus twice the average strut length.

Elongated float is a pontoon or floating ski with a convex surface, does not contain a massive power source and provides floatation.

Batteries refers to a low density power source which typically is an electric battery such as a series of lead-acid, metal hydride or other cells combined in one or more separate units. A "low density power source" in this context typically has less than 1 kilowatt hour of energy per 10 pounds when in a fully charged, or utilizable state.

Examples of Combined Features

Turning now more specifically to the figures, representative embodiments of the invention will be further explained as being applicable to a wide variety of watercraft, ranging from personal watercraft of less than 20 feet long to houseboats, and to ocean going watercraft.

FIG. 1 shows watercraft 10 having support members 20 that hold up platform 40 by four struts 50. As seen in this top view, propulsion units 60 are at the trailing ends of support members 20. The four foot by four foot platform 40 is held by thirteen inch long struts 50 above a pair of eight foot long support members 20 that are tapered at either end with ten inch diameter maximum thickness. Struts 50 are one-inch thick aluminum poles.

Figure 2:
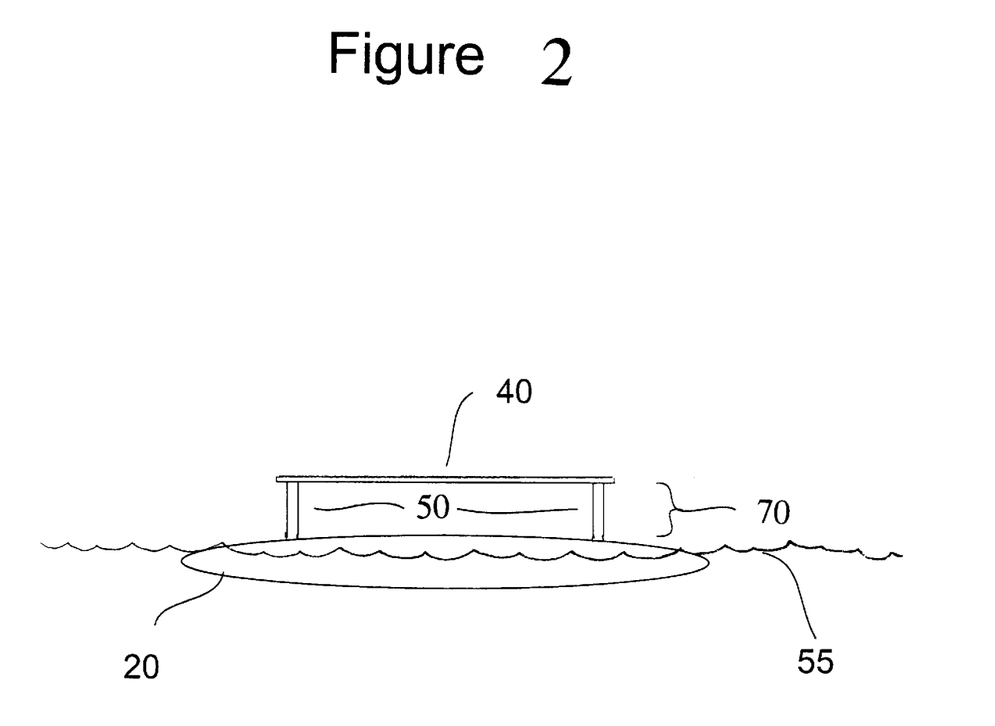
FIG. 2 is a side view of the watercraft shown in FIG. 1.
Figure 3A:
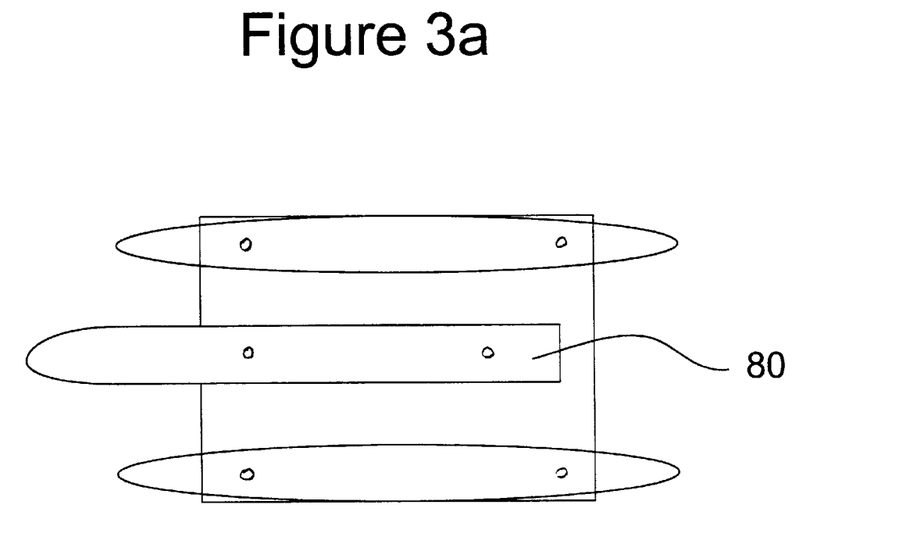
FIG. 3a is a top view of a watercraft as depicted in FIG. 1 that further comprises a centrally located water-ski for increased stability.
Figure 3B:
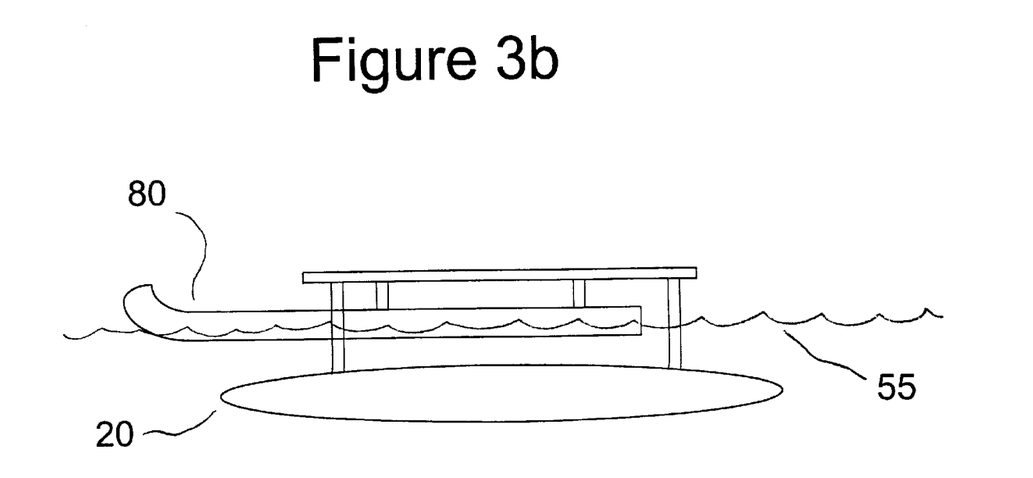
FIG. 3b is a side view showing the position of the water ski in the water.

FIG. 2 shows that struts 50 hold up platform 40 by a distance 70 and that support members 20 contain low energy power mass 30. The length of the platform equals the length of support members 20 minus twice distance 70. Wavy line 55 indicates a representative water level. FIG. 3a shows watercraft 10 with water-skis 80 installed for enhanced stability. FIG. 3b shows a side view of the watercraft from FIG. 3a and indicates that ski 80 is positioned higher in the water than support members 20.

Figure 4:
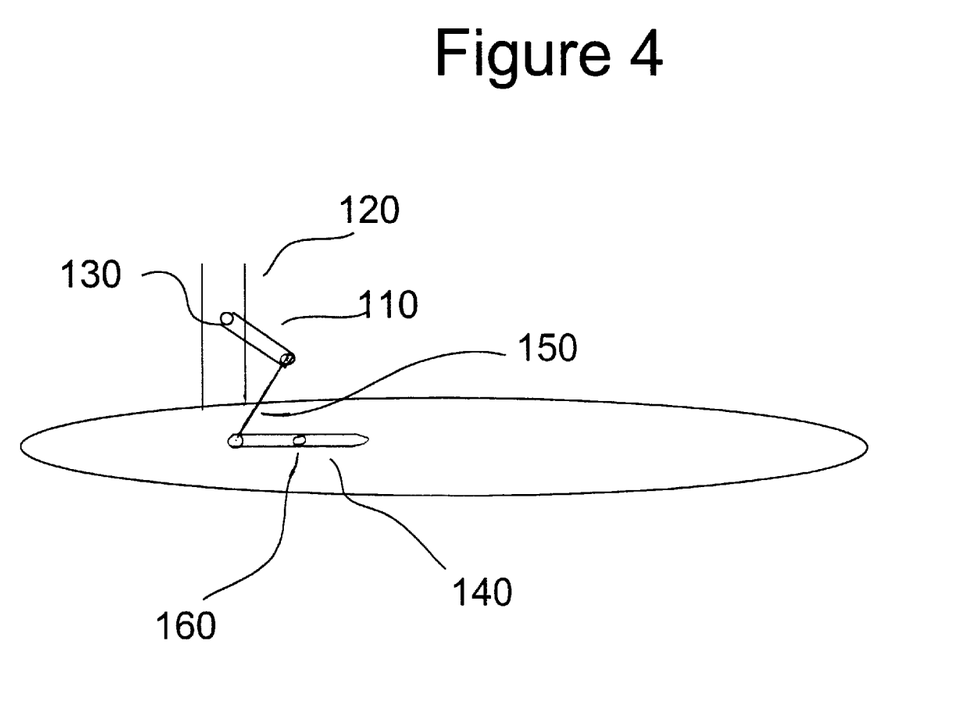
FIG. 4 shows a control surface deflector linkage means to prevent complete submersion.

FIGS. 4 and 5 show representative means to prevent submersion of the platform. FIG. 4 is a side view showing forward strut 120 with pivotally attached deflector component 110 that swings backwards upon contact with water. The end of component 110 opposite pivot pin 130 is mechanically attached via cable 150 to horizontal fin 140. Horizontal fin 140 pivots about pin 160. During normal conditions when the craft moves forward, the water level and waves are below component 110. When the watercraft pitches down, or submerges in the water during forward motion, component 110 receives the force of water movement and pivots back, actuating linkage 150, which forces horizontal fin 140 to pivot about pin 160. As a result, horizonal fin 140 presents a different attack angle to the onrushing water, forcing the bow of the watercraft up, and alleviating pressure upon component 110.

Figure 5A:
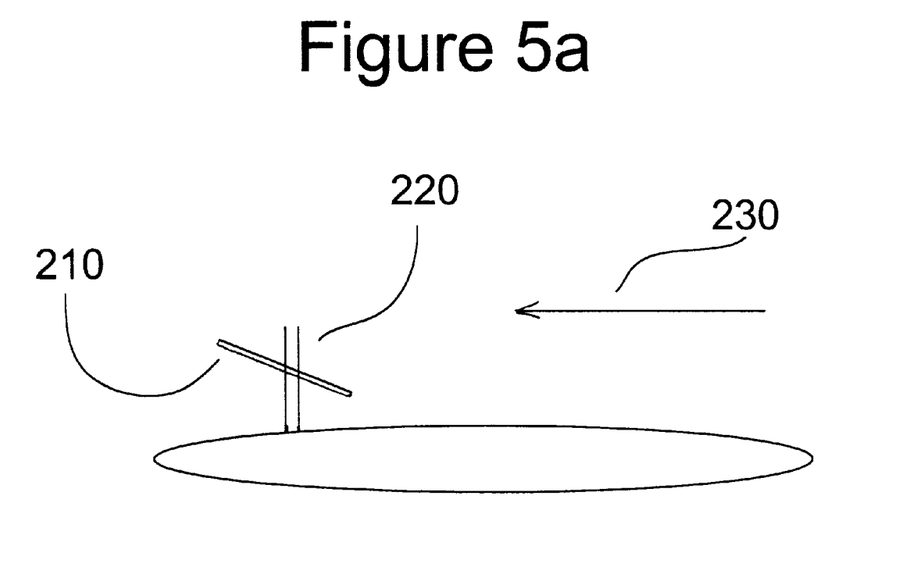
FIG. 5a is a side view and FIG. 5b is a front view.
Figure 5B:
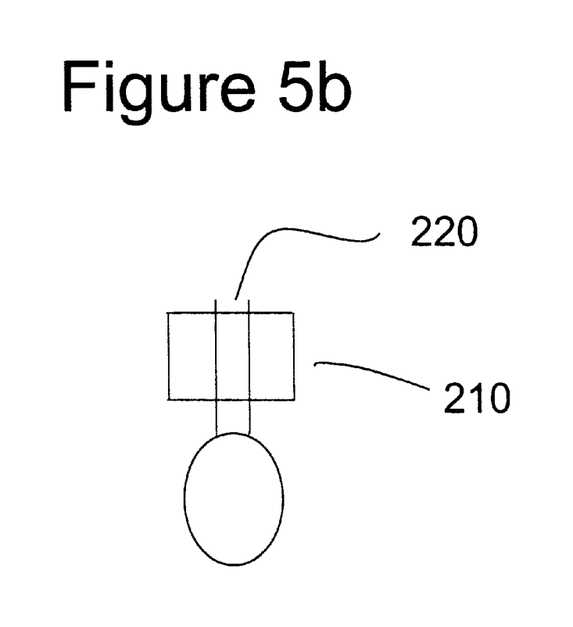

In FIG. 5, stationary force deflector 210 is connected to forward strut 220 at an angle as shown. During normal forward movement shown by arrow 230, deflector 210 is out of the water. However, when the watercraft pitches down, or submerges in the water during forward motion, deflector 210 collides with the water surface, pulling up the bow of the watercraft. FIG. 5a is a side view and FIG. 5b is a front view showing the width of deflector 210.

In FIG. 6, watercraft 310 has a fifteen foot long single support member 320 and two equally spaced floats (shown as skis 330 in this case), which hold up 12 foot long platform 340. Platform 340 is held up by one foot long struts 345 and 18 inch struts 347. Low energy density power supply 350 and propulsion unit 360 are positioned within support member 320. Floating skis 330 are beneath the two sides of platform 340 and have flat bottoms 15 inches wide. Each ski top is convex but the lowest two inches of the sides of each ski (which normally are always submerged) are vertical. Power supply 350 has a mass that, in this case, is 25% of the total watercraft mass and comprises lead acid batteries. Although not depicted here, float 330 can be pontoons.

FIG. 7 shows a single support member 410, which contains power supply 420, and a single floating ski 430 that support platform 440. Struts 450 connect member 410 to platform 440 and are longer than struts 460, which connect floating skis 430 to platform 440. As a result, support member 410 sits mostly submerged in the water and lower than floating ski 430, which rides higher in the water and skips on top of the water surface during forward motion. Support member 410 also contains propulsion unit 470, which rotates a propeller (not shown) counterclockwise (as seen from the rear) when in forward motion.

Figure 8A:
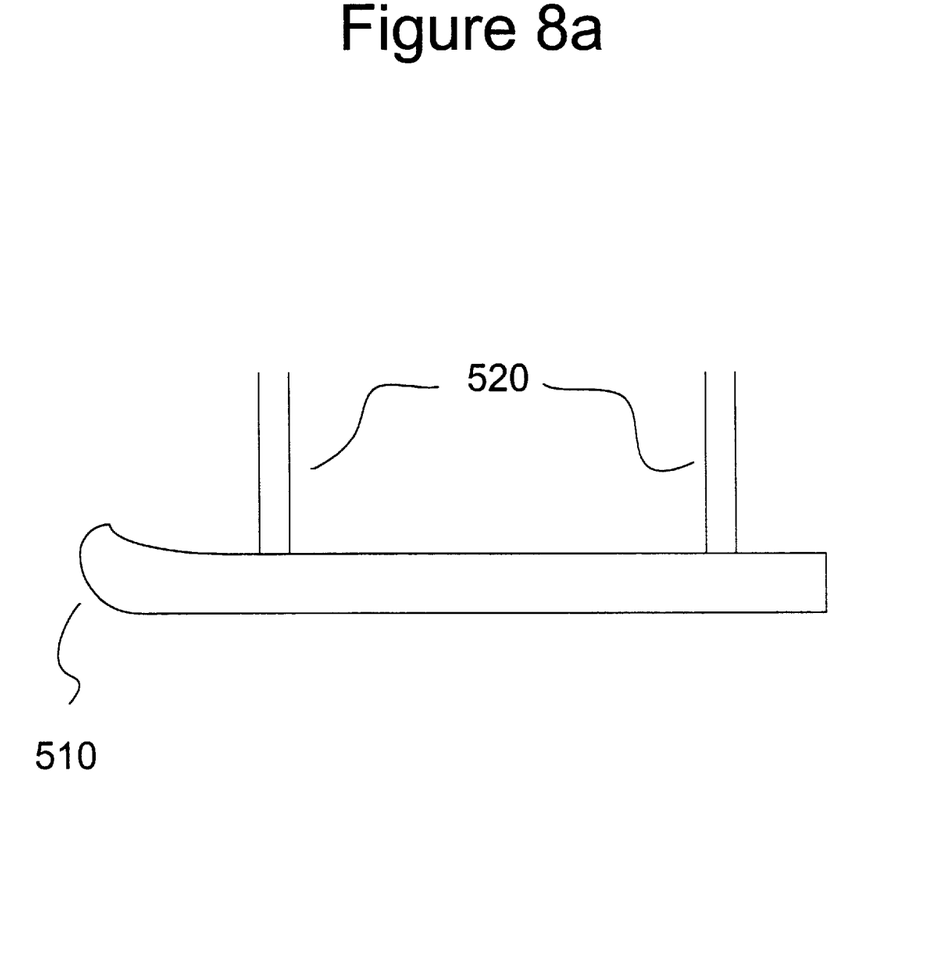
FIG. 8a is a side view showing a curved anterior end and a flat bottom.
Figure 8B:
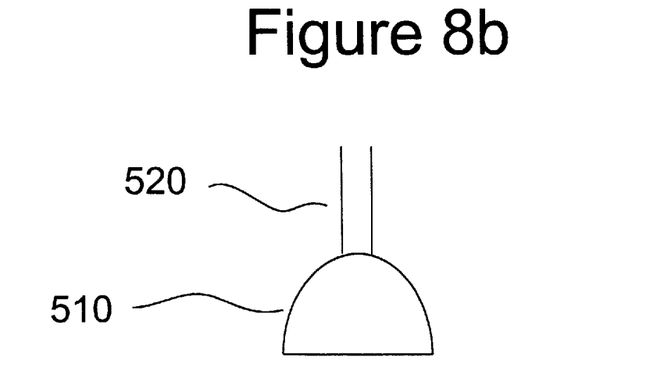
FIG. 8b is a cross section view showing the convex shape of a ski body with a flat bottom.

FIGS. 8a and 8b show an embodiment of floating skis 510 that provides low friction to the water surface. FIG. 8a is a side view showing a typical curve at the anterior part of the ski, which allows the skis to ride over the surface. Struts 520 are attached to the top of the ski. FIG. 8b is a cross section view showing a representative convex shape that provides low interaction with waves. In the depicted embodiment, the ski bottom is flat. In preferred embodiments for use in a houseboat, the elongated float departs from this ski shape and has a more rounded bottom as a generally tapered or straight shaped hull.

A scuba craft is also contemplated as an embodiment of the invention. In this case, the watercraft shown in FIG. 1 contains heavy power supplies in both support members and the platform has a chamber sealed on all four sides with a roof. The chamber contains a large opening at its bottom for easy access of a diver, which is always open to ambient pressure. Adjusting the amount of air in the support members controls buoyancy. In this embodiment, the craft can maintain the platform substantially above wave activity (i.e. such that the mean wave height is below the platform), yet completely submerge the platform and chamber when desired. This combination allows one or more divers to travel to a dive site and to take the watercraft down with them to search for particular features of the dive site. The divers can enter or exit the platform via the large opening at its bottom.

Other combinations of the inventive features described above, of course can be easily determined by a skilled artisan after having read this specification, and are included in the spirit and scope of the claimed invention. References cited above are specifically incorporated in their entireties by reference and represent art known to the skilled artisan.

We claim:

1. A watercraft, comprising:
   (a) at least one elongated, submerged support member having a convex upper surface;
   (b) a propulsion unit and a low energy density power source within the support member;
   (c) at least one floating ski positioned parallel to the support member; and
   (d) a platform
   wherein the support member and the at least one floating ski are positioned parallel to each other with the support member positioned lower than the ski and both hold the platform above the water surface via struts to allow at least some wave motion to pass unimpeded between the water surface and the platform, and wherein the low energy density power source comprises at least 10% of the watercraft weight.

2. The watercraft of claim 1, wherein the support member comprises a central portion that is tapered, for drag minimization, along a curve defined by a Fredholm integral equation of the second kind.

3. The watercraft of claim 1, comprising two skis wherein each ski has a convex surface and a buoyancy between one and thirty percent of the watercraft gross weight.

4. The watercraft of claim 1, wherein the buoyancy of at least the support member and a skis is controlled by movement of water or air into the support member or skis.

5. The watercraft of claim 1, wherein the low energy density power source comprises a fuel cell.

6. The watercraft of claim 1, wherein the watercraft has a length of less than 25 feet.

7. An electric powered watercraft having a center of gravity at or below its center of buoyancy, comprising two laterally arranged and elongated floats with convex surfaces, a centrally positioned and elongated submerged battery compartment positioned lower than the floats, and a platform held above the floats and the battery compartment by struts.

8. The watercraft of claim 7, wherein the mass of the central submerged battery compartment is at least 40% of the total watercraft mass.

9. The watercraft of claim 7, wherein the laterally arranged floats are pontoons.

10. The watercraft of claim 7, wherein each strut has a mean diameter that is less than 20% of its mean length.

11. The watercraft of claim 7, wherein the watercraft has a length of less than 25 feet.

12. A watercraft, comprising:
   (a) two elongated, partially submerged support members having convex upper surfaces and struts attached to the upper surfaces;
   (b) a propulsion unit and a low energy density power source within each support member; and
   (c) a platform attached to the tops of the struts and positioned above the support members, the platform length being less than the support members by at least the mean strut length,
   wherein the support members are positioned parallel to each other, the struts position the platform above the support members to allow at least some wave motion to pass unimpeded between the support members and the platform, and the low energy density power source comprises at least 25% of the total watercraft weight.

13. The watercraft of claim 12, wherein the low energy density power source comprises a fuel cell.

14. A watercraft, comprising:
   (a) two elongated, partially submerged support members having convex upper surfaces and struts attached to the upper surfaces;
   (b) a propulsion unit and a low energy density power source within each support member; and
   (c) a platform attached to the tops of the struts and positioned above the support members, the platform length being less than the support members by at least the mean strut length,
   wherein the support members are positioned parallel to each other and are at least 50% submerged, the struts position the platform above the support members to allow at least some wave motion to pass unimpeded between the support members and the platform, and the low energy density power source comprises at least 10% of the watercraft weight.

15. A watercraft, comprising:
(a) two elongated, partially submerged support members having convex upper surfaces and struts attached to the upper surfaces;
(b) a propulsion unit, a ballast control unit and a low energy density power source within each support member; and
(c) a platform attached to the tops of the struts and positioned above the support members, the platform length being less than the support members by at least the mean strut length, wherein the support members are positioned parallel to each other, the struts position the platform above the support members to allow at least some wave motion to pass unimpeded between the support members and the platform, the ballast control units within the support units can expel a volume of air that has a buoyancy greater than the equivalent weight of the platform, allowing the platform to submerge, and wherein the low energy density power source comprises at least 10% of the watercraft weight.

16. A watercraft, comprising:
(a) two elongated, partially submerged support members, wherein each support member comprises a central portion that is tapered, for drag minimization, along a curve defined by a Fredholm integral equation of the second kind having convex upper surfaces and further comprises struts attached to the upper surfaces;
(b) a propulsion unit and a low energy density power source within each support member; and
(c) a platform attached to the tops of the struts and positioned above the support members, the platform length being less the support members by at least the mean strut length, wherein the support members are positioned parallel to each other, the struts position the platform above the support members to allow at least some wave motion to pass unimpeded between the support members and the platform, and the low energy density power source comprises at least 10% of the watercraft weight.

17. A watercraft, comprising:
(a) two elongated, partially submerged support members having convex upper surfaces and struts attached to the upper surfaces;
(b) a propulsion unit and a low energy density power source within each support member;
(c) a platform attached to the tops of the struts and positioned above the support members, the platform length being less than that of the support members by at least the mean strut length; and
(d) a floating skis held below the platform by the struts and positioned parallel to and between the two support members, the floating skis having a buoyancy equal to at least five percent of the watercraft weight, wherein the support members are positioned parallel to each other, the struts position the platform above the support members to allow at least some wave motion to pass unimpeded between the support members and the platform, and the low energy density power source comprises at least 10% of the watercraft weight.

18. The watercraft of claim 17, wherein the skis extends below the length of the platform and has a convex upper surface.

19. A watercraft, comprising:
(a) two elongated, partially submerged support members having convex upper surfaces and struts attached to the upper surfaces;
(b) a propulsion unit and a low energy density power source within each support member;
(c) a platform attached to the tops of the struts and positioned above the support members, the platform length being less the support members by at least the mean strut length; and
(d) at least one a mechanical force deflector on a strut and/or on the platform to prevent immersion of the platform during forward motion of the watercraft, the deflector comprising a surface attached within the forward half of the watercraft above the water line and which forces the front of the watercraft up when the deflector hits the water surface, wherein the support members are positioned parallel to each other, the struts position the platform above the support members to allow at least some wave motion to pass unimpeded between the support members and the platform, and the low energy density power source comprises at least 10% of the watercraft weight.

* * * * *

UNITED STATES PATENT AND TRADEMARK OFFICE
CERTIFICATE OF CORRECTION

PATENT NO. : 6,073,569
DATED : June 13, 2000
INVENTOR(S) : Marvin A. Motsenbocker and Kayo Motsenbocker Page 1 of 1

It is certified that error appears in the above-identified patent and that said Letters Patent is hereby corrected as shown below:

<u>Title page,</u>
Assignee name "Murata Electric Boatworks LLC" should read -- Maruta Electric Boatworks LLC --

Signed and Sealed this

Eleventh Day of December, 2001

Attest:

NICHOLAS P. GODICI

Attesting Officer

Acting Director of the United States Patent and Trademark Office